(12) United States Patent
Luc

(10) Patent No.: US 6,473,028 B1
(45) Date of Patent: Oct. 29, 2002

(54) DETECTION OF THE DISTANCE BETWEEN AN ELECTROMAGNETIC TRANSPONDER AND A TERMINAL

(75) Inventor: Wuidart Luc, Pourrieres (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/543,220

(22) Filed: Apr. 5, 2000

(30) Foreign Application Priority Data

Apr. 7, 1999 (FR) .............................................. 99 04546

(51) Int. Cl.$^7$ .............................................. G01S 13/36
(52) U.S. Cl. ........................ 342/118; 342/127; 342/42
(58) Field of Search ............................ 342/42, 44, 51, 342/47, 118, 127

(56) References Cited

U.S. PATENT DOCUMENTS

| | | | | |
|---|---|---|---|---|
| 3,618,089 A | * | 11/1971 | Moran, Jr. .................. | 368/107 |
| 4,068,232 A | * | 1/1978 | Meyers et al. ................ | 342/44 |
| 4,278,977 A | * | 7/1981 | Nossen ........................ | 342/42 |
| 4,408,185 A | | 10/1983 | Rasmussen | |
| 4,656,472 A | | 4/1987 | Walton | |
| 4,782,308 A | | 11/1988 | Trobec et al. | |
| 4,802,080 A | | 1/1989 | Bossi et al. | |
| 4,814,595 A | * | 3/1989 | Gilboa ........................ | 235/492 |
| 4,963,887 A | | 10/1990 | Kawashima et al. | |
| 5,013,898 A | | 5/1991 | Glasspool | |
| 5,126,749 A | | 6/1992 | Kaltner | |
| 5,142,292 A | | 8/1992 | Chang | |

(List continued on next page.)

FOREIGN PATENT DOCUMENTS

| | | | |
|---|---|---|---|
| DE | 28 35 549 A1 | 3/1979 | |
| DE | 44 44 984 | 12/1994 | |
| DE | 195 46 928 | 6/1997 | |
| DE | 196 21 076 | 11/1997 | |
| DE | 196 32 282 A1 | 2/1998 | |
| EP | 0 038 877 | 11/1981 | |
| EP | 0 369 622 | 5/1990 | |
| EP | 0 568 067 A | 11/1993 | |
| EP | 0 579 332 A1 | 1/1994 | |
| EP | 0 645 840 A | 3/1995 | |
| EP | 0 768 540 | 4/1997 | |
| EP | 0 857 981 A1 | 8/1998 | |
| EP | 0 902 475 A | 3/1999 | |
| FR | 2 114 026 | 6/1972 | |
| FR | A-2 746 200 | 9/1997 | ............ G06K/7/10 |
| FR | 2 757 952 | 7/1998 | |
| GB | 2 298 553 A | 9/1996 | |
| GB | 2 321 726 A1 | 8/1998 | |
| WO | 93/17482 | 9/1993 | |
| WO | 98/20363 | 5/1998 | |
| WO | 99/33017 | 7/1999 | |
| WO | 99/43096 | 8/1999 | |

OTHER PUBLICATIONS

French Search Report from French Report Application 99 04546, filed Apr. 7, 1999.

French Search Report from French Patent Application No. 99 09563, filed Jul. 20, 1999.

(List continued on next page.)

*Primary Examiner*—John B. Sotomayor
(74) *Attorney, Agent, or Firm*—Wolf, Greenfield & Sacks, P.C.; James H. Morris

(57) ABSTRACT

A method and apparatus for determining the distance separating an electromagnetic transponder from a terminal generating a magnetic field by a first oscillating circuit, the transponder including a second oscillating circuit, upstream of a rectifying circuit adapted to providing a D.C. voltage. The method includes storing a first information relative to the level of the D.C. voltage when the second oscillating circuit is tuned on a determined frequency; storing a second information relative to the level of the D.C. voltage after having caused a frequency detuning of the second oscillating circuit; and comparing the two stored pieces of information.

38 Claims, 4 Drawing Sheets

U.S. PATENT DOCUMENTS

| | | | |
|---|---|---|---|
| 5,305,008 A | * 4/1994 | Turner et al. | 342/44 |
| 5,452,344 A | 9/1995 | Larson | |
| 5,493,267 A | 2/1996 | Ahlse et al. | |
| 5,504,485 A | 4/1996 | Landt et al. | |
| 5,521,602 A | 5/1996 | Carroll et al. | |
| 5,541,604 A | 7/1996 | Meier | |
| 5,550,536 A | 8/1996 | Flaxl | |
| 5,604,411 A | 2/1997 | Venkitasubrahmanian et al. | |
| 5,621,411 A | * 4/1997 | Hagl et al. | 342/42 |
| 5,691,605 A | 11/1997 | Xia et al. | |
| 5,703,573 A | * 12/1997 | Fujimoto et al. | 340/825.54 |
| 5,767,503 A | 6/1998 | Gloton | |
| 5,801,372 A | 9/1998 | Yamaguchi | |
| 5,831,257 A | 11/1998 | Yamaguchi | |
| 5,874,725 A | 2/1999 | Yamaguchi | |
| 6,025,780 A | 2/2000 | Bowers et al. | |
| 6,072,383 A | 6/2000 | Gallagher, III et al. | |
| 6,137,411 A | * 10/2000 | Tyren | 340/572.1 |
| 6,208,235 B1 | 3/2001 | Trontelj | |
| 6,229,443 B1 | 5/2001 | Roesner | |
| 6,243,013 B1 | * 6/2001 | Duan et al. | 340/572.7 |
| 6,265,962 B1 | 7/2001 | Black et al. | |
| 6,292,138 B1 | * 9/2001 | Choi | 342/458 |
| 6,295,019 B1 | * 9/2001 | Richards et al. | 342/125 |

OTHER PUBLICATIONS

French Search Report from French Patent Application No. 98 08025, filed Jun. 22, 1998.

French Search Report from French Patent Application No. 99 04547, filed Apr. 7, 1999.

French Search Report from French Patent Application No. 98 08024, filed Jun. 22, 1998.

French Search Report from French Patent Application No. 99 04548, filed Apr. 7, 1999.

French Search Report from French Patent Application No. 99 04544, filed Apr. 7, 1999.

French Search Report from French Patent Application No. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application No. 99 04545, filed Apr. 7, 1999.

French Search Report from French Patent Application No. 99 07024, filed May 31, 1999.

French Search Report from French Patent Application No. 00 06302, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

* cited by examiner

DETECTION OF THE DISTANCE BETWEEN AN ELECTROMAGNETIC TRANSPONDER AND A TERMINAL

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read/write terminal. The present invention more specifically relates to transponders having no independent power supply. Such transponders extract the power supply required by the electronic circuits included therein from the high frequency field radiated by an antenna of the read/write terminal. The present invention applies to such transponders, be they read-only transponders, that is, transponders for operating with a terminal that only reads the transponder data, or read/write transponders, which contain data that can be modified by the terminal.

The present invention more specifically relates to the detection by a transponder of the distance separating it from a terminal and, more specifically, of the transponder position with respect to a distance threshold of the terminal conditioning the system operation.

2. Discussion of the Related Art

Electromagnetic transponders are based on the use of oscillating circuits including a winding forming an antenna, on the transponder side and on the read/write unit side. These circuits are intended to be coupled by a close magnetic field when the transponder enters the field of the read/write unit. The range of a transponder system, that is, the maximum distance from the terminal at which a transponder is activated (awake) depends, especially, on the size of the transponder antenna, on the excitation frequency of the coil of the oscillating circuit generating the magnetic field, on the intensity of this excitation, and on the transponder power consumption.

FIG. 1 very schematically shows, in a functional way, a conventional example of a system of data exchange between a read/write unit 1 (STA) and a transponder 10 (CAR).

Generally, terminal 1 is essentially formed of an oscillating circuit formed of an inductance L1 in series with a capacitor C1 and a resistor R1, between an output terminal 2p of an amplifier or antenna coupler 3 (DRIV) and a terminal 2m at a reference potential (generally, the ground). Amplifier 3 receives a high-frequency transmission signal Tx, provided by a modulator 4 (MOD). The modulator receives a reference frequency, for example, from a quartz oscillator 5 and, if necessary, a data signal to be transmitted. In the absence of a data transmission from terminal 1 to transponder 10, signal Tx is used only as a power source to activate the transponder if said transponder enters the field. The data to be transmitted generally come from a digital electronic system, for example, a microprocessor 6 ($\mu$P).

The connection node of capacitor C1 and inductance L1 forms, in the example shown in FIG. 1, a terminal for sampling a data signal Rx, received from a transponder 10 and intended for a demodulator 7 (DEM). An output of the demodulator communicates (if necessary via a decoder (DEC) 8) the data received from transponder 10 to microprocessor 6 of read/write terminal 1. Demodulator 7 receives, generally from oscillator 5, a clock or reference signal for a phase demodulation. The demodulation may be performed from a signal sampled between capacitor C1 and resistor R1 and not across inductance L1. Microprocessor 6 communicates (bus EXT) with different input/output (keyboard, screen, means of transmission to a provider, etc.) and/or processing circuits. The circuits of the read/write terminal draw the power necessary for their operation from a supply circuit 9 (ALIM), connected, for example, to the electric supply system.

On the side of transponder 10, an inductance L2, in parallel with a capacitor C2, forms a parallel oscillating circuit (called a reception resonant circuit) intended for capturing the magnetic field generated by series oscillating circuit L1C1 of terminal 1. The resonant circuit (L2, C2) of transponder 10 is tuned on the frequency of the oscillating circuit (L1, C1) of terminal 1.

Terminals 11, 12, of resonant circuit L2C2, which correspond to the terminals of capacitor C2, are connected to two A.C. input terminals of a rectifying bridge 13 formed, for example, of four diodes D1, D2, D3, D4. In the representation of FIG. 1, the anode of diode D1 and the cathode of diode D3 are connected to terminal 11. The anode of diode D2 and the cathode of diode D4 are connected to terminal 12. The cathodes of diodes D1 and D2 form a positive rectified output terminal 14. The anodes of diodes D3 and D4 form a reference terminal 15 of the rectified voltage. A capacitor Ca is connected to rectified output terminals 14, 15 of bridge 13 to store power and smooth the rectified voltage provided by the bridge. It should be noted that the diode bridge may be replaced with a single-halfwave rectifying assembly.

When transponder 10 is in the field of terminal 1, a high frequency voltage is generated across resonant circuit L2C2. This voltage, rectified by bridge 13 and smoothed by capacitor Ca, provides a supply voltage to electronic circuits of the transponder via a voltage regulator 16 (REG). These circuits generally include, essentially, a microprocessor ($\mu$P) 17 (associated with a memory not shown), a demodulator 18 (DEM) of the signals that may be received from terminal 1, and a modulator 19 (MOD) for transmitting information to terminal 1. The transponder is generally synchronized by means of a clock (CLK) extracted, by a block 20, from the high-frequency signal recovered across capacitor C2 before rectification. Most often, all the electronic circuits of transponder 10 are integrated in a same chip.

To transmit the data from transponder 10 to unit 1, modulator 19 controls a stage of modulation (back modulation) of resonant circuit L2C2. This modulation stage is generally formed of an electronic switch (for example, a transistor T) and of a resistor R, in series between terminals 14 and 15. Transistor T is controlled at a so-called sub-carrier frequency (for example, 847.5 kHz), much smaller (generally with a ratio of at least 10) than the frequency of the excitation signal of the oscillating circuit of terminal 1 (for example, 13.56 MHz). When switch T is closed, the oscillating circuit of the transponder is submitted to an additional damping as compared to the load formed of circuits 16, 17, 18, 19 and 20, so that the transponder draws a greater amount of power from the high frequency field. On the side of terminal 1, amplifier 3 maintains the amplitude of the high-frequency excitation signal constant. Accordingly, the power variation of the transponder translates as an amplitude and phase variation of the current in antenna L1. This variation is detected by demodulator 7 of terminal 1, which is either a phase demodulator or an amplitude demodulator. For example, in the case of a phase demodulation, the demodulator detects, in the sub-carrier half-periods where switch T of the transponder is closed, a slight phase shift (a few degrees, or even less than one degree) of the carrier of signal Rx with respect to the reference signal. The output of demodulator 7 (generally the output of a band-pass filter centered on the sub-carrier frequency) then provides an image signal of the control signal of switch T that can be decoded (by decoder 8 or directly by microprocessor 6) to restore the binary data.

It should be noted that the terminal does not transmit data when it receives some from a transponder, the data transmission occurring alternately in one direction, then in the other one (half-duplex).

FIG. 2 illustrates a conventional example of data transmission from terminal 1 to a transponder 10. This drawing shows an example of shape of the excitation signal of antenna L1 for a transmission of a code 1011. The modulation currently used is an amplitude modulation with a 106 kbit/s rate (a bit is transmitted in approximately 9.5 $\mu$s) much smaller than the frequency (for example, 13.56 MHz) of the carrier coming from oscillator 5 (period of approximately 74 ns). The amplitude modulation is performed either in all or nothing or with a modulation ratio (defined as being the difference of the peak amplitudes between the two states (0 and 1), divided by the sum of these amplitudes) smaller than one due to the need for supply of transponder 10. In the example of FIG. 2, the carrier at 13.56 MHz is modulated in amplitude, with a 106-kbit/s rate, with a modulation rate tm of 10%.

FIG. 3 illustrates a conventional example of a data transmission from transponder to terminal 1. This drawing illustrates an example of the shape of the control signal of transistor T, provided by modulator 19, for a transmission of a code 1011. On the transponder side, the back modulation is generally of resistive type with a carrier (called a sub-carrier) of, for example, 847.5 kHz (period of approximately 1.18 $\mu$s). The backmodulation is, for example, based on a BPSK-type (binary phase-shift keying) coding at a rate on the order of 106 kbits/s, much smaller than the sub-carrier frequency.

It should be noted that, whatever the type of modulation or back modulation used (for example, amplitude, phase, frequency) and whatever the type of data coding (NRZ, NRZI, Manchester, ASK, BPSK, etc.), this modulation or back modulation is performed digitally, by jumping between two binary levels.

The oscillating circuits of the terminal and the transponder are generally tuned on the carrier frequency, that is, their resonance frequency is set on the 13.56-MHz frequency. This tuning aims at maximizing the energy diffusion to the transponder, generally, a card of credit card size integrating the different transponder components.

In some applications, it may be desired to know the distance separating the transponder from a terminal, or the position of the transponder with respect to a distance threshold. Such a distance detection can be used, for example, to switch the system to an operating mode or another according to whether the transponder is close (on the order of 2 to 10 cm) or very close (less than approximately 2 cm) to the reader. The notion of proximity involves the distance separating antennas L1 and L2 from each other.

Document WO-A-97/34250 provides a device of contactless information exchange with an electronic label, this device including means for preprocessing a signal representative of the distance between the label and the device, based on the signal transmitted by the label. These means are used to determine and to signal, to the information exchange device, that the information coming from the label is included in a window of predetermined value. The device described by this document uses a measurement of the amplitude of a low-frequency modulation provided by the label responsive to a read control signal sent by the device. According to this document, the amplitude of this modulation is representative of the distance separating the label from the information exchange device.

In addition to the fact that the distance detection of this document is performed on the terminal side, this detection requires a demodulation of the back-modulated signal transmitted by the transponder as well as a preprocessing of the demodulated signal to extract the distance information therefrom.

SUMMARY OF THE INVENTION

The present invention aims at providing a novel solution of distance measurement between a transponder and a reader. In particular, the present invention aims at providing a solution that is implemented on the transponder side and not on the read/write terminal side.

The present invention also aims at providing a solution that enables easily detecting the position of a transponder with respect to a distance threshold separating it from the terminal.

The present invention also aims at a distance threshold that is self-adaptive according to the system environment.

To achieve these and other objects, the present invention provides a method of determining the distance separating an electromagnetic transponder from a terminal generating a magnetic field by means of a first oscillating circuit, the transponder including a second oscillating circuit, upstream of a rectifying means adapted to providing a D.C. voltage, the method comprising the steps of:

storing a first information relative to the level of the D.C. voltage when the second oscillating circuit is tuned on a determined frequency;

storing a second information relative to the level of the D.C. voltage after having caused a frequency detuning of the second oscillating circuit; and comparing the two stored pieces of information.

According to an embodiment of the present invention, the measurements are periodically performed and the variation of the stored information is compared for two successive measurements in the same tuning conditions.

According to an embodiment of the present invention, said pieces of information represent the respective values of the D.C. voltage.

According to an embodiment of the present invention, the comparison between the first and second pieces of information is used to determine the position of the transponder with respect to a critical coupling position of the respective oscillating circuits of the transponder and of the terminal.

According to an embodiment of the present invention, the determined frequency corresponds to the excitation frequency of the oscillating circuit of the terminal for the remote supply of the transponder.

According to an embodiment of the present invention, the method is applied to determining the operating mode of the transponder among two modes respectively corresponding to a tight coupling or loose coupling position.

The present invention also relates to an electromagnetic transponder including at least one switched capacitor to implement the method of the present invention.

According to an embodiment of the present invention, the transponder includes a capacitor, in parallel with an inductive element of the second oscillating circuit, and in series with a switching means, the rectifying means being formed of a one-way conduction element.

According to an embodiment of the present invention, the transponder includes two capacitors, respectively associated with each end terminal of an inductive element of the second oscillating circuit, each capacitor being connected in series with a switching means, a reference terminal of which is connected to a reference supply potential of the electronic circuit, downstream of the rectifying means.

According to an embodiment of the present invention, the transponder further includes two resistive modulation means, in parallel with a capacitor for smoothing the rectified voltage provided by the rectifying means.

The foregoing objects, features and advantages of the present invention, will be discussed in detail in the following non-limiting description of specific embodiments in connection with the accompanying drawings.

DETAILED DESCRIPTION

Figure 1:
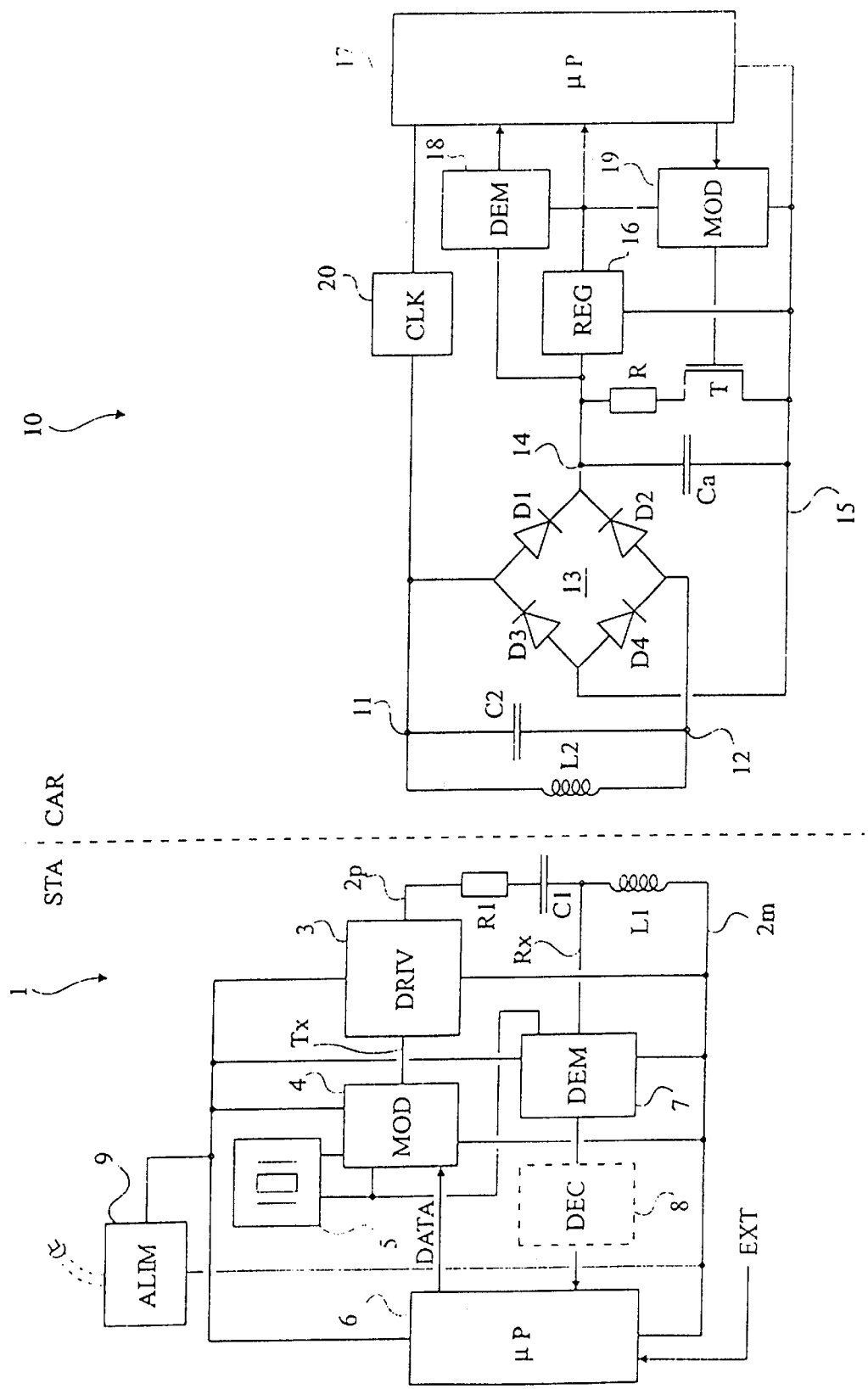
FIGS. 1 to 3, previously described, are intended for showing the state of the art and the problem to solve.
Figure 2:
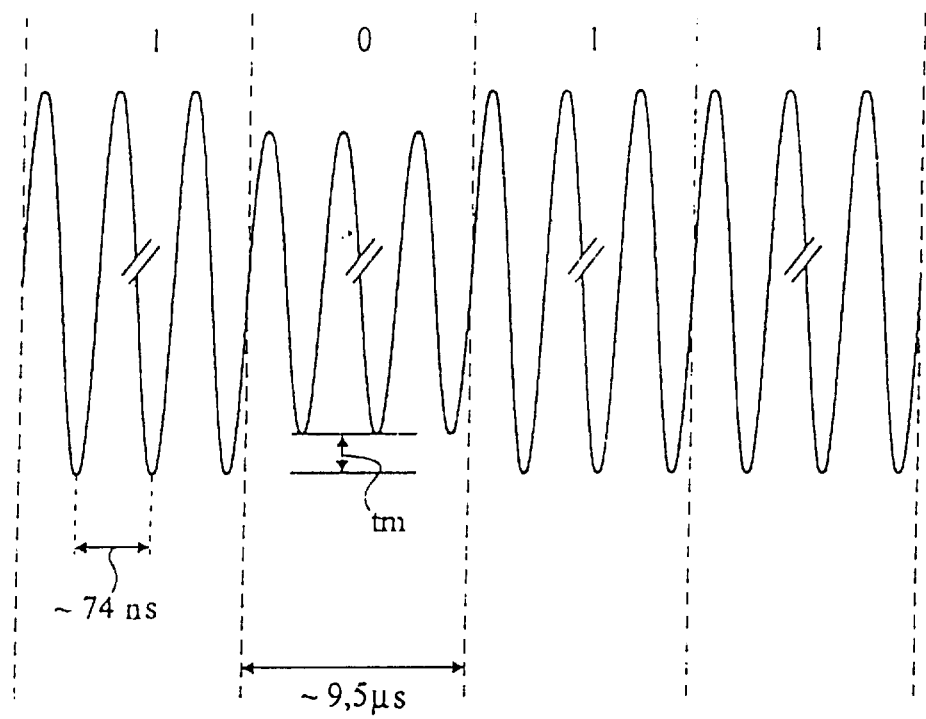
Figure 3:
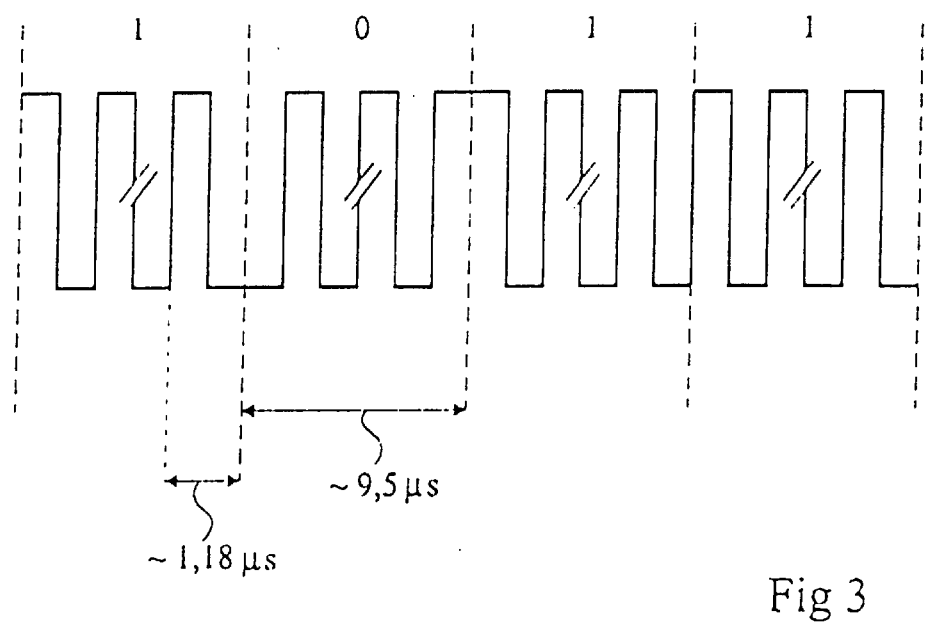

The same elements have been referred to with the same references in the different drawings and the drawings are out of scale. For clarity, only those elements necessary to the understanding of the present invention have been shown in the drawings and will be described hereafter.

A feature of the present invention is, to determine the distance separating a transponder from a read/write terminal, to test the behavior of the transponder according to whether its oscillating circuit is or not tuned to the frequency of the system remote supply carrier. Thus, a feature of the distance determination method according to the present invention is to compare the respective variations of the signal received by the transponder antenna according to whether the oscillating signal thereof is or not tuned to the remote supply frequency. Preferably, this detection is performed by monitoring the remote supply voltage recovered by the transponder, downstream of the rectifying means for providing a D.C. supply voltage to the digital portion of the transponder. Thus, according to a preferred embodiment of the present invention, the voltage recovered across the rectified voltage smoothing capacitor (for example, Ca, FIG. 1) is monitored.

Still according to a preferred embodiment, the monitoring of the voltage recovered at the output of the rectifying means is not performed with respect to a threshold, but the voltage values obtained are compared according to whether the oscillating circuit is or not tuned to the carrier frequency. This amounts to detecting the transponder position with respect to a critical coupling position.

The critical coupling position corresponds to the distance at which the coupling between the transponder and the terminal is optimized by a maximum remote supply amplitude received by the transponder when the oscillating circuits of the terminal and of the transponder are both tuned to the remote supply carrier frequency. In other words, the critical coupling frequency corresponds to the distance at which the remote supply power is maximum for a minimum coupling factor, the coupling factor being the ratio of the mutual inductance on the square root of the product of the inductances of the oscillating circuits.

According to this embodiment, it may be assumed that the present invention compares, according to whether the oscillating circuit is tuned or not, the supply voltage level of the digital circuits of the transponder with respect to a relative threshold.

It should however be noted that the present invention also enables determination of the distance separating the transponder from a terminal, for example, by comparing the voltage levels with a stored correspondence table.

The distance determination method of the present invention can advantageously be implemented during a communication, before each information transmission from the transponder to the terminal. The duration required to execute a distance determination according to the present invention is perfectly compatible with the time (of a few hundreds of milliseconds) of presence of a transponder in the reader's field.

To perform the tuning or detuning of the transponder oscillating circuit in a controllable way, the capacitance of this oscillating circuit is preferably modified to change its resonance frequency, and thus to detune it from the remote supply carrier frequency.

A first solution includes connecting, in parallel with the transponder antenna, two capacitors, one of which is associated in series with a switch to make it controllable. This solution includes using, for other purposes, an assembly of the type described in document WO-A-98/29760, which provides a frequency detuning of a transponder by means of a capacitance capable of being modified in the oscillating circuit.

Figure 4:
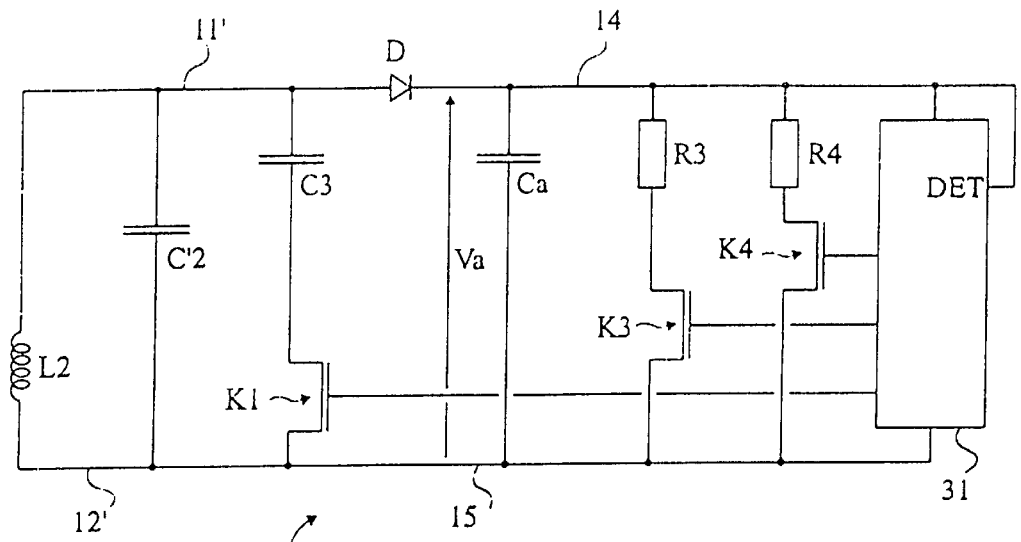
FIG. 4 shows a first embodiment of an electromagnetic transponder according to the present invention.

FIG. 4 shows a first embodiment of a transponder 30 according to the present invention implementing this first solution. As previously, this transponder is formed from a parallel oscillating circuit including an inductance or antenna L2 and a capacitor C2' between two terminals 11', 12' of the circuit.

In the embodiment illustrated in FIG. 4, the rectification performed to extract a D.C. supply voltage Va smoothed by a capacitor Ca is a single-halfwave rectification by means of a diode D, the anode of which is connected to terminal 11' and the cathode of which is connected to positive terminal 14 of capacitor Ca. Voltage reference 15 corresponds to the negative terminal of capacitor Ca directly connected to terminal 12'. Voltage Va is meant for an electronic block 31 including, for example, circuits 16 to 20 of FIG. 1. A capacitor C3 is connected in series with a switch (for example, a MOS transistor) K1 between terminals 11 and 12.

According to a preferred embodiment of the present invention, the electronic circuit is provided with an input DET receiving local supply voltage Va. Input DET is associated with a circuit (not shown) for measuring voltage Va and with at least one element for storing this measurement. In a specific example of embodiment, said element may be a microprocessor (6, FIG. 1).

The values of the measured voltages are either stored analogically or, preferentially, digitally over several bits, the number of which depends on the desired analysis precision.

As a simplified embodiment, the use of a dedicated distance determination input (DET) may be avoided by using an existing input of the microprocessor (contained in block 31) of the transponder. This conventional input controls the available local supply voltage across capacitor Ca with respect to a predetermined threshold. The microprocessor stores (in the form of a bit) the state of this voltage with respect to the threshold. The bit is conventionally used, for example, for detecting whether the voltage recovered by the oscillating circuit is sufficient for the transponder supply, and thus to activate said transponder when it enters the field of a reader. This function exists, for example, in transponder microprocessors, for example, circuits ST16 and ST19 of STMicroelectronics, and may thus be used without significantly modifying the transponder.

According to a preferred embodiment of the present invention, the following measurement cycle is periodically performed when the transponder is in the range of the terminal and, preferably, as soon as the transponder is activated (supplied) by its entering the field of a reader. Transistor K1 is initially on, the oscillating circuit being tuned. The voltage present on terminal DET is stored. Then, transistor K1 is turned off. The circuit is then detuned, its resonance frequency being shifted to, for example, more than twice the tuning frequency if capacitors C2' and C3 have the same value. The voltage present on terminal DET is stored again. As an alternative, the first measurement is performed with a detuned circuit. The two obtained values are compared and the result of this comparison is stored, for example on a single bit.

It should be noted that the time (for example, on the order of a few hundreds of milliseconds) required to perform the two "tuned" and "detuned" measurements is small as compared to the transponder displacement speed that corresponds, in most applications, to the displacement speed of a hand.

It should also be noted that the duration for which the oscillating circuit is detuned to perform a measurement is, preferably, chosen to be substantially different from the sub-carrier half-period, so that this measurement is not interpreted by the terminal as a back modulation. Indeed, the detuning of the transponder oscillating circuit translates as a phase shift in oscillating circuit L1C1 (FIG. 1) of the terminal that, during the distance determination, must not be mistaken for a data transmission.

The above measurement cycle is repeated after a short time interval (for example, on the order of one millisecond) that remains fast as compared to the passing time of a transponder before a terminal (several hundreds of milliseconds).

The variation of the value of the comparison bit enables knowing whether the transponder is closer or further away from the terminal as compared to the critical coupling position.

Conversely to known distance measurement systems (for example, document WO-A-97/34250), the present invention takes account of the fact that the remote supply power recovered on the transponder side is not a monotonic function of the distance separating the transponder from the reader.

Indeed, when the oscillating circuits are tuned on the remote supply carrier frequency, if the transponder comes close to a terminal, the amplitude of the remote supply starts increasing from the limit of the system range (on the order of some ten centimeters). This amplitude transits through a maximum (critical coupling position), then starts decreasing again when the transponder becomes very close (approximately less than 2 centimeters).

However, when the oscillating circuit of the transponder is detuned from the remote supply carrier frequency, the power received by the transponder increases as the distance from the terminal decreases, but with a reduced range. In this case, there also is a distance at which the received power is maximum for a given detuning condition. This is an optimal coupling, the critical coupling position being the optimal coupling condition when both oscillating circuits are tuned on the carrier frequency. It should be noted that the optimal coupling coefficient between the two oscillating circuits depends not only on inductances L1 and L2, on capacitors C1 and C2, and on the frequency (which here is a fixed frequency and corresponds to the carrier frequency), but also on series resistance R1 of the terminal, and on the load of the oscillating circuit of the transponder, that is, on the equivalent resistance of the circuits (microprocessor, etc.) and on the back modulation means (for example, resistor R3 or R4 as will be seen hereafter), added in parallel on capacitor C2 and on inductance L2.

Thus, based on the state of the comparison bit, the position of the transponder with respect to the critical coupling may be known without measuring the exact distance. If the bit indicates a higher level in detuned position than in tuned position, this means that the transponder is very close to the terminal (in tight coupling). In the opposite case, the transponder is either close to the critical coupling, or between the critical coupling position and the system range limit.

According to another embodiment, the respective successive values of the voltages are stored to study their variation. The measurement can then be refined by determining the direction of the possible transponder motion. If the power levels, respectively tuned and detuned, vary in the same direction between two measurements, this means that the transponder is between the critical coupling position and the system range limit. According to the direction of this variation, it can be determined whether the transponder moves away or comes close to the terminal, and the distance can even be known from a correspondence table stored in the transponder.

If the power levels, respective tuned and detuned, vary in opposite directions between two measurements, this means that the transponder is between the terminal and the critical coupling position. If the tuned level increases while the detuned level decreases, this means that the transponder comes close to the critical coupling position by moving away from the terminal. If the tuned level decreases and the detuned level increases, this means that the transponder comes closer to the terminal.

As an alternative embodiment, for example using the conventional bit for detecting the microprocessor supply level, the respective voltage levels of the tuned and detuned circuit may be compared with a predetermined threshold. In this case, an information about the position of the transponder with respect to the distance threshold corresponding to the critical coupling is then still available. If the detuned level is under the threshold and the tuned level is greater than the threshold, the transponder is relatively far from the terminal (between the critical coupling position and the range limit). If the detuned level is above the threshold and the tuned level is under the threshold, the transponder is very close to the terminal. If both levels are above the threshold, the transponder is in the vicinity of the critical coupling position. If both levels are under the threshold, the transponder is out of the system range.

It should be noted that, in a simplified embodiment, it may be enough to determine, before each beginning of data transmission from the transponder to the terminal, the transponder position with respect to the critical coupling.

The detuning of the oscillating circuit may be performed in both directions, either by increasing or by decreasing its resonance frequency with respect to the remote supply carrier frequency. However, it has been acknowledged that the effects of the detuning are not symmetrical. In particular, the effects of the capacitance modification that translates as a variation of the quality factor are, for a given modification value, stronger for a decrease than for an increase of the capacitance. Further, the more the capacitance is decreased, the more the optimal coupling position is close to the terminal. The more the capacitance is increased, the more this optimal coupling position is far from the terminal. It should be noted that according to the present invention, it is preferable to cause a strong detuning of the oscillating circuit with respect to the remote supply carrier frequency. Accordingly, the detuning is performed by decreasing the capacitance of the transponder oscillating circuit, and thus by shifting, to the higher frequencies, its resonance frequency. Thus, switch K1 is closed for a tuned operation.

The solution of the first embodiment described in relation with FIG. 4 requires, to be viable in practice, a single-halfwave rectification.

Indeed, in a fullwave rectification, for example, by means of a diode bridge, this solution raises significant problems, in practice, due to the need to control the switch from the electronic circuit supplied by the rectified voltage. Indeed, on the transponder side, no common reference potential between the oscillating circuit and the rectified voltage is available, so that it is actually impossible to control such a capacitor in parallel on the antenna by means of a simple MOS transistor controlled by the transponder's electronic circuit. Indeed, this electronic circuit is supplied downstream of the rectifying means while the capacitor of the oscillating circuit is located upstream of this rectifying circuit. This problem is particularly acute for a fullwave rectification of the voltage sampled across the transponder's oscillating circuit, which is preferable to optimize the remote supply.

Thus, the present invention provides other embodiments of a transponder in which the modification of the oscillating circuit equivalent capacitance can be performed by simple means. In particular, the present invention provides enabling control, by means of simple MOS transistors, of a capacitive modulation means of the transponder's oscillating circuit.

Figure 5:
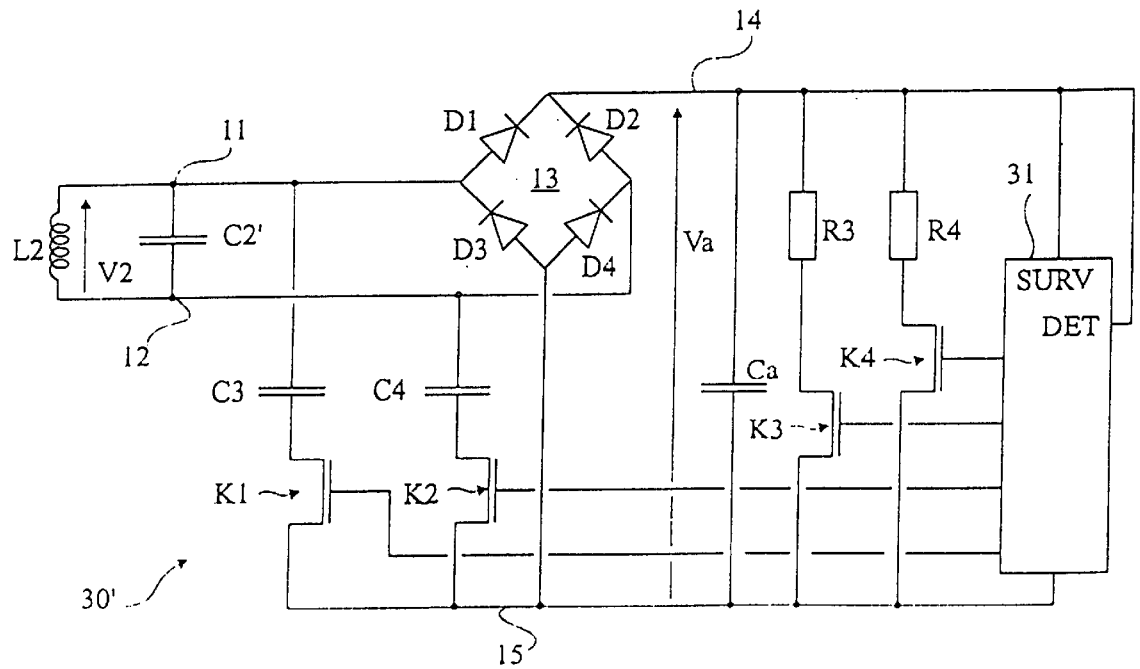
FIG. 5 shows a second embodiment of an electromagnetic transponder according to the present invention.

FIG. 5 shows a second embodiment of a transponder 30' according to the present invention. According to this embodiment, terminals 11, 12 of the oscillating circuit are connected to the A.C. input terminals of a bridge 13 formed, for example, of diodes D1 to D4 as in FIG. 1. Two rectified output terminals 14, 15 of bridge 13 provide, via smoothing capacitor Ca, voltage Va that supplies electronic block 31.

According to this embodiment, two capacitors C3 and C4 are respectively connected in series with a switch (for example, a MOS transistor) K1, K2, respectively between terminals 11 and 12 and terminal 15. Thus, a first terminal of capacitor C3 is connected to terminal 11, its second terminal being connected, via transistor K1, to terminal 15. A first terminal of capacitor C4 is connected to terminal 12 while its other terminal is connected, via a transistor K2, to terminal 15. Capacitors C3 and C4 are respectively associated with each sign of high frequency A.C. voltage V2 across antenna L2. Capacitors C3 and C4 are thus of same value. Transistors K1 and K2 are controlled by block 31, preferable from a same signal, to be turned on when the circuit has to be tuned on the remote supply carrier frequency.

It should be noted that, due to the doubling of the capacitors, a reference node is available (line 15) for the control of switches K1 and K2. Thus, if switches K1 and K2 are formed of N-channel MOS transistors, it is now possible, by a logic signal coming from block 31, to control these switches in all or nothing, which is not possible with the solution advocated by document WO-A-98/29760.

For example, capacitors C2', C3 and C4 have, each, a capacitance corresponding to half the capacitance (C2, FIG. 1) necessary to tune the oscillating circuit on the reader carrier frequency.

Figure 6:
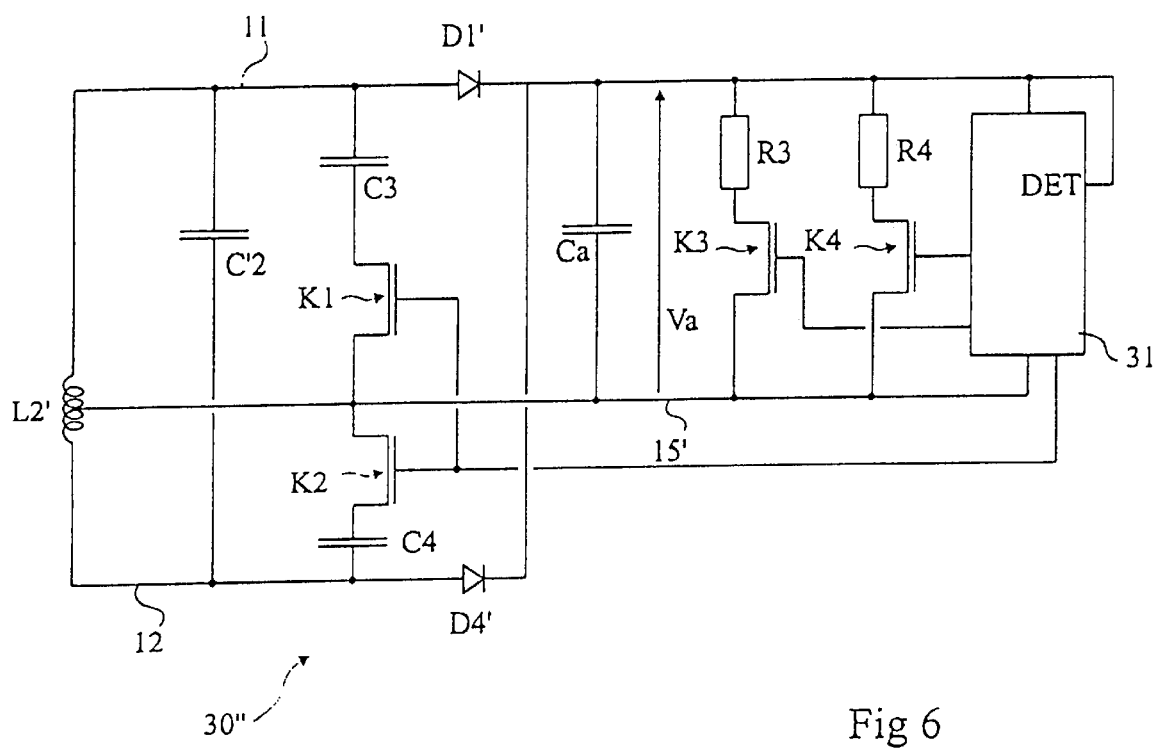
FIG. 6 shows a third embodiment of an electromagnetic transponder according to the present invention.

FIG. 6 shows a third embodiment of a transponder 30" according to the present invention. Transponder 30" has substantially the same components as that of FIG. 5.

A feature of this third embodiment is to provide an inductance L2' with a midpoint. This midpoint is then used as a reference 15 for the D.C. supply of electronic circuits 31 of the transponder. Thus, a first terminal 11 of winding L2' is connected to the anode of a rectifying diode D1', the cathode of which forms positive local supply terminal 14 of the transponder. A second terminal 12 of winding L2' is connected to the anode of a second rectifying diode D4', the cathode of which is connected to terminal 14. As previously, a capacitor Ca is connected between terminal 14 and reference line 15 to smooth the supply voltage of electronic circuits 31. Between each of terminals 11, 12 and reference line 15 is connected a switched capacitor according to the present invention formed, for example as in FIG. 5, of a capacitor C3, C4 in series with a switch K1, K2.

It should be noted that the controls of switches K1, K2 may be performed from a same control signal provided by block 31, as illustrated in FIG. 6, or by distinct control signals (FIG. 5).

In the embodiments of FIGS. 5 and 6, transistors K1 and K2 are preferably on when the oscillating circuit is to be tuned. If, in particular in the circuit of FIG. 6, capacitors C3 and C4 have, each, a value that is twice the value of capacitor C2', the resonance frequency is, when transistors K1 and K2 are off, approximately pushed back to twice the carrier frequency.

Detecting the transponder position with respect to the distance corresponding to the critical coupling is a preferred embodiment of the present invention due to the advantages that it provides for an application to a tight coupling operation. It should however be noted that the present invention may also be implemented to detect the transponder position with respect to any distance threshold, which is then stored in the transponder's electronic circuit.

In a distance determination with respect to the critical coupling, the present invention has the advantage that the performed distance determination or area detection (tight coupling or loose coupling) is close to a differential measurement. Indeed, the detection is performed with respect to the critical coupling that depends on the system and on its environment. Only at the critical coupling is the recovered voltage threshold maximum when the circuits are tuned. It is thus not necessary to provide a specific reference or distance threshold. In other words, the distance threshold between the two tuned and detuned operating modes is then self-adaptive.

An example of application of the present invention is to operate the transponder, either tuned or detuned, according to the distance separating it from the reader. Such a detuning for the information exchange between the transponder and the terminal is particularly advantageous when the transponder is very close to the reader. In such a case, if the oscillating circuits are tuned, the power transmitted from the terminal to the transponder is such that the latter heats up. This thermal effect is particularly disturbing if the transponder is formed of a plastic card of credit-card type. Indeed, in such a case, the thermal effect results in deforming the card when it is very close to the terminal.

Implementing the present invention enables, in this application, switching the transponder operation to a detuned operation if it is very close to the reader. The consequence of such a detuning is that the operation becomes similar to that of a transformer, that is, the quality factor is less involved. Now, in the conventional tuned operation, a quality factor as high as possible is desired, to optimize the power transfer associated with the transponder remote supply. In a conventional detuned operation, the terminal power, that is, the current through the antenna (L1, FIG. 1), may be decreased while transmitting a sufficient power to the card remote supply. Indeed, since the transponder is very close to the terminal, the problem of remote supply range has disappeared.

The decrease of the current required in the terminal antenna suppresses the thermal effect on the transponder side. The required power then essentially depends on the transformation ratio (ratio between the number of spirals) of inductances L1 and L2.

It should also be noted that, since the circuits are detuned, the pass-band is higher. Indeed, when the circuits are tuned, the signal envelope (Rx, FIG. 1) recovered on the terminal side shows an enable time for each bit transmission time. This enable time is precisely due to the fact that the oscillating circuits are tuned. Such an enable time is prejudicial to the data transmission rate.

It should be noted that the detuning of the oscillating circuits for the data transmission is only desirable in very close coupling. Accordingly, the implementation of the present invention enables easily dissociating the two operating modes of the system according to whether the transponder is or not very close to the reader.

A transponder 30 (FIG. 4), 30' (FIG. 5) or 30" (FIG. 6) of the present invention also includes a resistive back modulation circuit formed, preferably, of two resistors R3, R4 respectively in series with a switch K3, K4 between terminals 14 and 15. Resistors R3 and R4 have different values, respectively high and low. The function of resistors R3 and R4 will be better understood in relation with an example of application of the present invention to an operation in very close coupling of the transponder with a reader.

Consider being between the critical coupling position and the terminal, resistor R3, which is of high value, is to used to perform the back modulation and transistor K1 (or transistors K1 and K2) is turned off. The system then has a detuned operation close to a transformer operation.

Consider being far from the critical coupling position while being further away from the terminal than this position, that is, consider a loose coupling. Transistor K1 (or transistors K1 and K2) is then turned on and the resistive back modulation is performed by means of resistor R4 that is of smaller value. This then is a conventional operating mode.

It should be noted that the present invention, by using a resistance of small value when away from the terminal, optimizes the system range. The ratio between the respective values of resistors R3 and R4 is, for example, included between 4 and 10 (R3 between 0.4 and 5 kilo ohms and R4 between 100 and 500 kiloohms) and, preferably, on the order of 6 (for example, approximately 1500 and 250 ohms).

As an alternative, the resistor of high value (R4) may be permanently left (by the turning on of switch K4) in the circuit when in switched operation of resistor R3. In this case, the static load decreases, which decreases the quality factor and thus increases the maximum possible rate. It should be noted that this improvement may be obtained by other means (for example, a third switched resistor).

It should also be noted that the present invention requires no (modulation) information transmission from the reader to the transponder or from the transponder to the reader for the distance determination. The transponder of the present invention thus detects its position with no intervention of the reader. The transponder may then, for example, transmit in back modulation a different message according to its position, the nature of this message placing the system in one operating mode or another.

It should further be noted that the distance determination is, preferably, periodically carried out during the communication. This enables, for example, checking that the transponder does not change operating areas during a communication, or detecting this change if the system provides different communication modes while authorizing them in a same communication.

As an alternative, capacitor C2' may be eliminated and a capacitor C3 (FIG. 4) or two capacitors C3 and C4 (FIGS. 5 and 6) may be used, each having a capacitance corresponding to the necessary value of the tuning. In this case, the circuit stray capacitances behave as complementary capacitors of the oscillating circuit when switch K1 (FIG. 4) or switches K1 and K2 (FIGS. 5 and 6) are off.

According to another alternative, the capacitor(s) used to detune the circuit is (are) also used as a back modulation means. In this case, switched resistors R3, K3, and R4, K4 are suppressed and the values of capacitors C2', C3 (and C4 for the embodiments of FIGS. 5 and 6) are chosen so that the importance of the detuning is compatible with the phase shift to be detected by the terminal in case of a capacitive modulation. The capacitive modulation directly influences the phase of the voltage across inductance L1 of the terminal without acting upon its amplitude. This eases the phase detection by the terminal. It should be noted that the type of back modulation does not modify the coding, that is, the control signal of the back modulation switch(es) at the sub-carrier frequency.

Of course, the present invention is likely to have various alterations, modifications, and improvements which will readily occur to those skilled in the art. In particular, the respective sizings of the different capacitors and resistors are within the abilities of those skilled in the art according to the application and, especially, on the used frequencies and on the system range. In the sizing of the oscillating circuit capacitors, account will be taken of the rectifying means used and of the value of smoothing capacitor Ca. Indeed, the conduction periods of the diodes of a bridge (FIG. 5) are generally shorter as compared to the remote supply carrier period than the conduction periods of a single-halfwave rectifying diode (FIG. 4). Accordingly, the duty ratio of action of the back modulation means is different according to the type of rectification performed. Now, this duty ratio has an influence, on the terminal side, on the value of the phase shift to be detected.

Further, although the present invention has been described in relation with an application enabling two, respectively tuned and detuned, operating modes, it should be noted that the present invention may also be used to detect the transponder position with respect to the critical coupling position (or even with respect to another distance position) for, for example, only allow one of the two operating modes described in relation with the above specific application.

The present invention in applicable to, among other areas, contactless chip cards (for example, identification cards for access control, electronic purse cards, cards for storing information about the card holder, consumer fidelity cards, toll television cards, etc.) and read or read/write systems for these cards (for example, access control terminals or porticoes, automatic dispensers, computer terminals, telephone terminals, televisions or satellite decoders, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of determining a distance separating an electromagnetic transponder from a terminal generating a magnetic field via a first oscillating circuit, the transponder including a second oscillating circuit, upstream of a rectifier adapted to provide a D.C. voltage having a level, the method comprising the steps of:
   storing a first information relative to the level of the D.C. voltage when the second oscillating circuit is tuned on a determined frequency;
   storing a second information relative to the level of the D.C. voltage after having caused a frequency detuning of the second oscillating circuit; and
   comparing the first and second information.

2. A method of determining a distance separating an electromagnetic transponder from a terminal generating a magnetic field via a first oscillating circuit, the transponder including a second oscillating circuit, upstream of a rectifier adapted to provide a D.C. voltage having a level, the method comprising steps of:
   storing a first information relative to the level of the D.C. voltage when the second oscillating circuit is tuned on a determined frequency;
   storing a second information relative to the level of the D.C. voltage after having caused a frequency detuning of the second oscillating circuit; and
   periodically measuring said levels and comparing the variation of the stored information for two successive measurements in the same tuning conditions.

3. The method of claim 1, wherein said first and second information represent respective values of the D.C. voltage.

4. A method of determining a distance separating an electromagnetic transponder from a terminal generating a magnetic field via a first oscillating circuit, the transponder including a second oscillating circuit, upstream of a rectifier adapted to provide a D.C. voltage having a level, the method comprising steps of:
   storing a first information relative to the level of the D.C. voltage when the second oscillating circuit is tuned on a determined frequency;
   storing a second information relative to the level of the D.C. voltage after having caused a frequency detuning of the second oscillating circuit; and
   comparing the first and second information, wherein the comparison between the first and second information is used to determine the position of the transponder with respect to a critical coupling position of the respective oscillating circuits of the transponder and of the terminal.

5. The method of claim 1, wherein the determined frequency corresponds to an excitation frequency of the oscillating circuit of the terminal for the remote supply of the transponder.

6. A method of determining a distance separating an electromagnetic transponder from a terminal generating a magnetic field via a first oscillating circuit, the transponder including a second oscillating circuit, upstream of a rectifier adapted to provide a D.C. voltage having a level, the method comprising steps of:
   storing a first information relative to the level of the D.C. voltage when the second oscillating circuit is tuned on a determined frequency;
   storing a second information relative to the level of the D.C. voltage after having caused a frequency detuning of the second oscillating circuit;
   comparing the first and second information and determining an operating mode of the transponder among two modes respectively corresponding to a tight coupling or loose coupling position.

7. An electromagnetic transponder capable of determining a distance separating the electromagnetic transponder from a terminal generating a magnetic field via a first oscillating circuit, the transponder comprising:
   a second oscillating circuit that includes at least one switched capacitor and is tuned at a first frequency when the at least one switched capacitor is in a first state and is detuned from the first frequency when the at least one switched capacitor is in a second state;
   a rectifier, coupled to the second oscillating circuit, that produces a D.C. voltage at a first level when the second oscillating circuit is tuned to the first frequency and at a second level when the second oscillating circuit is detuned from the first frequency;
   a storage element for storing first and second information respectively relative to the first and second levels of the D.C. voltage; and
   a comparator that compares the first and second information.

8. The electromagnetic transponder of claim 7, further comprising a second capacitor, in parallel with an inductive element of the second oscillating circuit, and in series with a switch, and wherein the rectifier is formed of a one-way conduction element.

9. An electromagnetic transponder capable of determining a distance separating the electromagnetic transponder from a terminal generating a magnetic field via a first oscillating circuit, the transponder comprising:
   a second oscillating circuit that includes at least one switched capacitor and is tuned at a first frequency when the at least one switched capacitor is in a first state and is detuned from the first frequency when the at least one switched capacitor is in a second state;
   a rectifier, coupled to the second oscillating circuit, that produces a D.C. voltage at a first level when the second oscillating circuit is tuned to the first frequency and at a second level when the second oscillating circuit is detuned from the first frequency;
   a comparator that compares the first and second information; and
   two capacitors, respectively associated with each end terminal of an inductive element of the second oscillating circuit, each capacitor being connected in series with a switch, a reference terminal of which is connected to a reference supply potential downstream of the rectifier.

10. The electromagnetic transponder of claim 9, further comprising two resistive modulators, in parallel with a capacitor for smoothing the rectified voltage provided by the rectifier.

11. A method of determining a distance separating a transponder and a terminal generating an electromagnetic field oscillating at a first oscillation frequency, wherein the transponder includes an oscillating circuit, the method comprising acts of:

(A) detecting the electromagnetic field with the oscillating circuit tuned to the first oscillation frequency;

(B) producing a first signal corresponding to the detected electromagnetic field when the oscillating circuit is tuned to the first oscillation frequency;

(C) detuning the oscillating circuit to a second oscillation frequency;

(D) detecting the electromagnetic field with the oscillating circuit detuned to the second oscillation frequency;

(E) producing a second signal corresponding to the detected electromagnetic field when the oscillating circuit is detuned to the second oscillation frequency; and (F) comparing the first and second signals to yield an output corresponding to the distance between the transponder and the terminal.

12. The method of claim 11, wherein the act (C) comprises an act of switching a switch to alter the oscillation frequency of the oscillating circuit.

13. The method of claim 11, wherein the act (B) comprises an act of rectifying an output of the oscillating circuit, to produce a rectified first signal.

14. The method of claim 13, wherein the act (B) further comprises an act of smoothing the rectified signal.

15. The method of claim 11, further comprising an act of storing at least one of the first and the second signals.

16. The method of claim 11, wherein the act (F) comprises an act of yielding an output that corresponds to the distance with respect to a critical coupling distance.

17. The method of claim 11, further comprising an act of comparing at least one of the first and second signals to a threshold value.

18. The method of claim 17, wherein the threshold value is stored in a table.

19. The method of claim 11, wherein the act (C) comprises an act of changing a capacitance in the oscillating circuit to alter a resonance frequency of the oscillating circuit.

20. The method of claim 11, further comprising an act of periodically switching a resonance frequency of the oscillating circuit between the first oscillation frequency and the second oscillation frequency while moving the transponder with respect to the terminal.

21. The method of claim 20, further comprising an act of determining a direction of motion of the transponder using the first and second signals obtained while moving the transponder.

22. The method of claim 11, further comprising an act of generating a digital signal corresponding to the distance between the transponder and the terminal.

23. The method of claim 11, wherein the act (C) comprises an act of switching the transponder from a first operating power level to a second operating power level.

24. The method of claim 11, further comprising an act of transmitting in back modulation a message from the transponder indicative of the distance separating the transponder and the terminal.

25. An apparatus that determines a distance between a transponder and a terminal generating electromagnetic radiation, the apparatus comprising:

an oscillating circuit, tunable to a first oscillation frequency and to a second oscillation frequency, that generates an output varying with the distance when the oscillating circuit is located adjacent the transponder; and a processor that receives the output of the oscillating circuit when tuned to both the first and second oscillating frequencies and generates a signal corresponding to the distance between the transponder and the terminal.

26. The apparatus of claim 25, further comprising an antenna, coupled to the oscillating circuit, to receive the electromagnetic radiation sent by the terminal.

27. The apparatus of claim 25, further comprising a switch to tune the oscillating circuit between the first and second oscillation frequencies.

28. The apparatus of claim 25, further comprising a rectifier, connected between the oscillating circuit and the processor, which rectifies the output of the oscillating circuit.

29. The apparatus of claim 28, further comprising a capacitor, coupled to the rectifier, that smoothes an output of the rectifier.

30. The apparatus of claim 25, further comprising a memory, coupled to the processor, that stores a signal corresponding to the output of the oscillating circuit.

31. The apparatus of claim 25, further comprising a transmitter that transmits the signal generated by the processor.

32. The apparatus of claim 31, wherein the transmitter comprises a modulator and a switch for back modulation.

33. The apparatus of claim 30, wherein the memory stores a correspondence table.

34. The apparatus of claim 25, wherein the oscillating circuit is manufactured on a compact low power chip adapted for installation in any of a credit card, an identification card and a smart card.

35. An apparatus for determining a distance between first and second objects, comprising:

a first oscillating circuit, coupled to the first object, having a first oscillation frequency and producing a first signal that varies with a distance of the first object from the second object;

a second oscillating circuit, coupled to the first object, having a second oscillation frequency, and producing a second signal that varies with the distance between the first and second objects; and a processor that receives information representative of the first and second signals and, based thereon, produces an output signal corresponding to the distance between the two objects.

36. The apparatus of claim 35, wherein the two objects are a mobile transponder and an electromagnetic terminal.

37. The apparatus of claim 35, wherein the first and second oscillating circuits share at least one component in common.

38. A method for determining a distance separating a first object and a second object, wherein the first object generates an electromagnetic field having a first oscillation frequency, and wherein the second object is coupled to a second oscillating circuit; the method comprising acts of:

(A) generating a first signal from the second oscillating circuit when tuned to a first frequency, the first signal representative of a detection of the electromagnetic field;

(B) generating a second signal from the second oscillating circuit when tuned to a second frequency, the second signal representative of a detection of the electromagnetic field; and (C) determining the distance separating the first and second objects based on the first and second signals.

* * * * *

UNITED STATES PATENT AND TRADEMARK OFFICE
CERTIFICATE OF CORRECTION

PATENT NO.    : 6,473,028 B1
DATED         : October 29, 2002
INVENTOR(S)   : Luc Wuidart It is certified that error appears in the above-identified patent and that said Letters Patent is hereby corrected as shown below:

<u>Title page,</u>
Item [12], should read -- [12] United States Patent Wuidart --
Item [75], should read -- [75] Inventor: Luc Wuidart, Pourrieres (FR) --

Signed and Sealed this

Eleventh Day of February, 2003

JAMES E. ROGAN
*Director of the United States Patent and Trademark Office*